(12) United States Patent
Nakagawa (10) Patent No.: US 10,306,445 B2
(45) Date of Patent: May 28, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 15/414,038

(22) Filed: Jan. 24, 2017

(65) Prior Publication Data

US 2017/0223761 A1  Aug. 3, 2017

(30) Foreign Application Priority Data

Jan. 29, 2016  (JP) ................. 2016-016374

(51) Int. Cl.
*H04W 4/80* (2018.01)
*G06F 3/14* (2006.01)
*H04L 29/08* (2006.01)
*G09G 5/00* (2006.01)

(52) U.S. Cl.
CPC ............ *H04W 4/80* (2018.02); *G06F 3/1454* (2013.01); *G09G 5/006* (2013.01); *G09G 2370/025* (2013.01); *G09G 2370/16* (2013.01); *H04L 67/1095* (2013.01); *H04L 67/16* (2013.01)

(58) Field of Classification Search
CPC .......... H04L 2012/5608; H04W 84/12; H04W 88/08; H04W 80/04; H04W 88/06; H04W 84/18; H04W 74/08

USPC ............. 370/310.2, 328, 338, 349, 378, 282
See application file for complete search history.

(56) References Cited

U.S. PATENT DOCUMENTS

| | | | | |
|---|---|---|---|---|
| 2012/0254338 A1* | 10/2012 | Agarwal | ............ | H04W 40/246 709/208 |
| 2013/0083724 A1* | 4/2013 | Sindhu | ............... | H04L 12/4633 370/328 |
| 2014/0342660 A1* | 11/2014 | Fullam | .................. | H04N 7/181 455/3.06 |
| 2016/0360450 A1* | 12/2016 | Yang | ..................... | H04W 76/34 |

FOREIGN PATENT DOCUMENTS

JP  2014-509821 A  4/2014

* cited by examiner

*Primary Examiner* — Brenda H Pham
(74) *Attorney, Agent, or Firm* — Canon U.S.A., Inc. IP Division (57) ABSTRACT

A communication apparatus selects to transmit a first signal indicating that the communication apparatus can execute a first function of transmitting data on which output processing is performed by an output unit to an external apparatus, a second signal indicating that the communication apparatus can execute a second function of receiving data on which output processing is performed by an external apparatus and performing output processing based on the received data, or a third signal indicating that the communication apparatus can execute both the first function and the second function, based on a function of a first external communication apparatus that is connecting to the communication apparatus, and connects to a second external communication apparatus that has responded to one of the selected and transmitted signals.

16 Claims, 8 Drawing Sheets

COMMUNICATION APPARATUS, CONTROL METHOD, AND STORAGE MEDIUM

BACKGROUND

Field

Aspects of the present disclosure generally relate to an apparatus that transmits and receives data on which output processing is to be performed.

Description of the Related Art

In recent years, a mirroring technology for sharing display screen data wirelessly has been standardized as Wi-Fi® Display (Miracast®). Mirroring is a technique to share the content of a display screen by transmitting display screen data that is being displayed by a transmitting apparatus to a receiving apparatus via a network and allowing the receiving apparatus to output the same display screen as that of the transmitting apparatus. In Wi-Fi® Display, a source device, which has the function of transmitting display screen data, a sink device, which has the function of receiving display screen data, and a dual-role device, which has both of those functions, are defined as various roles.

A method for determining whether each audio/video apparatus serves as a source device or a sink device has been proposed in Japanese Patent Application Laid-Open No. 2014-509821 (Japanese translation of a PCT patent application).

In Wi-Fi® Display, the dual-role device notifies an external communication apparatus that the dual-role device has both the function serving as a source device (source function) and the function serving as a sink device (sink function). However, even a dual-role device can use only one of the source function and the sink function to communicate with an external communication apparatus that is newly targeted for connection.

For example, there can be considered a case where the number of devices to which the dual-role device when serving as a source device is allowed to connect is limited to one. In such a situation, when the dual-role device when serving as a source device has already been connecting to one sink device, the dual-role device is not able to connect to a new sink device. However, if the dual-role device notifies the new sink device that the dual-role device has both the function serving as a source device and the function serving as a sink device, the dual-role device can perform connection processing with the new sink device in spite of the fact that the dual-role device is unable to communicate with the new sink device.

SUMMARY

Aspects of embodiments are generally directed to enabling an apparatus including both the function of transmitting data to an external apparatus and the function of performing output processing based on received data to perform a notification adapted to a situation.

According to an aspect of embodiments, a communication apparatus includes an output unit configured to perform output processing based on data, a first transmission unit configured to transmit a first signal indicating that the communication apparatus can execute a first function of transmitting data on which output processing is performed by the output unit to an external apparatus, a second transmission unit configured to transmit a second signal indicating that the communication apparatus can execute a second function of receiving data on which output processing is performed by an external apparatus and performing output processing based on the received data, a third transmission unit configured to transmit a third signal indicating that the communication apparatus can execute both the first function and the second function, a determination unit configured to determine in which of the first function and the second function a first external communication apparatus connecting to the communication apparatus is operating, a selection unit configured to select whether to transmit the first signal, the second signal, or the third signal based on a result of determination by the determination unit, and a connection unit configured to connect to a second external communication apparatus that has responded to one of the first, second, or third signals selected by the selection unit and transmitted.

Further features will become apparent from the following description of exemplary embodiments with reference to the attached drawings.

DESCRIPTION OF THE EMBODIMENTS

Figure 1:
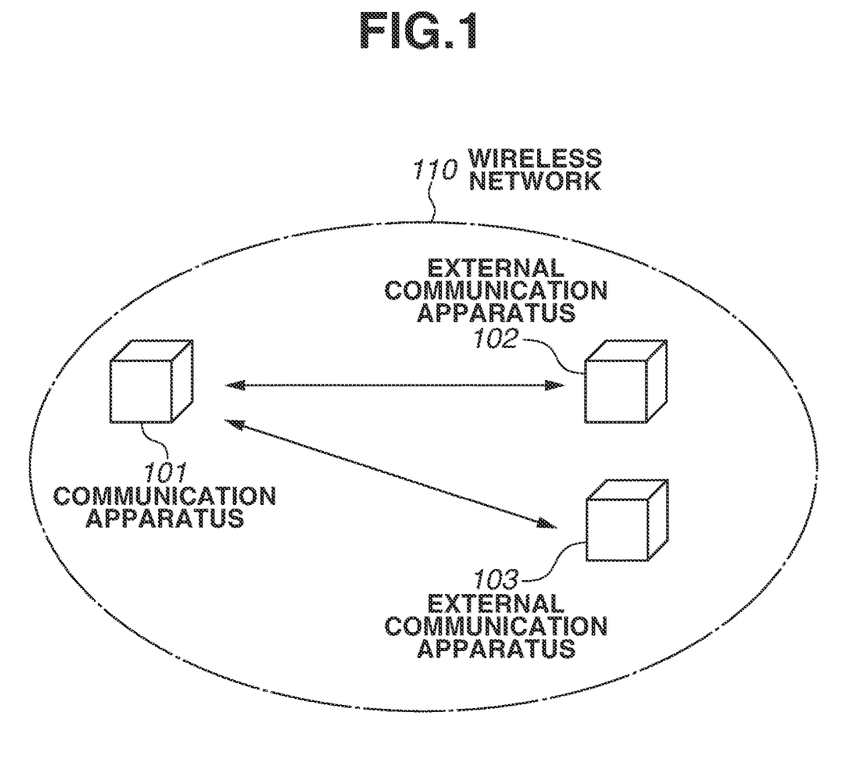
FIG. 1 a network configuration diagram of a communication system.

FIG. 1 illustrates a network configuration of a communication system according to an exemplary embodiment. In a wireless network 110, a communication apparatus 101 performs wireless communications with external communication apparatuses 102 and 103. Here, the communication apparatus 101 operates in conformity with the Miracast® standard. In the Miracast® standard, a Source function, a Sink function, and a Dual-Role function are prescribed.

The Source function is a function of transmitting, to an external apparatus, data which is output from an output unit (a display or a speaker) included in the communication apparatus 101 and allowing an output unit included in the external apparatus to perform output processing that is based on the data. An apparatus having the Source function is referred to as a "source device". The Sink function is a function of receiving data which is output from an output unit included in an external apparatus and allowing an output unit included in the communication apparatus 101 to perform output processing that is based on the received data. An apparatus having the Sink function is referred to as a "sink device". In Wi-Fi® Display, the source device and the sink device are paired to perform data communication.

The Dual-Role function is a function of being capable of executing both the Source function and the Sink function. An apparatus having the Dual-Role function is referred to as a "dual-role device". In particular, an apparatus capable of executing both the Source function and the Sink function in a concurrent manner is referred to as a "concurrent dual-role device". The communication apparatus 101 as cited herein is a concurrent dual-role device. Each of the external communication apparatuses 102 and 103 is a source device or a sink device.

Examples of the source device include an image input apparatus, such as a tablet, a smartphone, a personal computer (PC), a mobile phone, a camera, and a video camera, but are not limited to those. Examples of the sink device include an image output apparatus, such as a tablet, a smartphone, a PC, a mobile phone, a television set, a set-top box, a head-mounted display, a projector, a display, or a car navigation apparatus, but are not limited to those.

Moreover, examples of the dual-role device include an image input apparatus, such as an imaging apparatus (for example, a camera or a video camera) and a scanner, and an image output apparatus, such as a projector, a television set, and a display. Moreover, the dual-role device can be a storage device, such as a hard disk device and a memory device, or an information processing apparatus, such as a PC, a smartphone, a tablet, or a car navigation apparatus, and is not limited to those.

While, in the following description, the communication apparatus 101 as cited herein is compliant with the IEEE 802.11 series, the configuration of the present exemplary embodiment is also applicable to a communication apparatus compliant with another wireless communication system, such as Bluetooth®, Ultra Wide Band (UWB), ZigBee, and MBOA (Multiband PFDM Alliance). Examples of UWB include wireless universal serial bus (USB), wireless 1394, and WINET. The configuration of the present exemplary embodiment is also applicable to a communication apparatus compliant with a wired communication system, such as a wired local area network (LAN). Additionally, the communication apparatus 101 and the external communication apparatus 102 or 103 can not only directly communicate with each other but also communicate with each other via a relay device (not illustrated) (for example, an access point).

Figure 2:
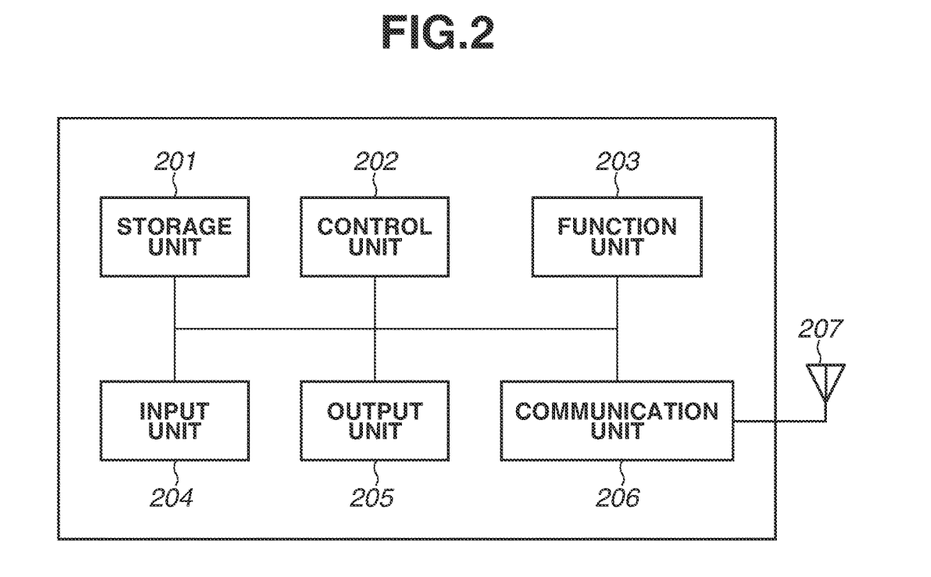
FIG. 2 is a hardware configuration diagram of a communication apparatus.

FIG. 2 illustrates a hardware configuration of the communication apparatus 101. A storage unit 201, which is configured with a memory, such as a read-only memory (ROM) or a random access memory (RAM), stores programs used to perform various operations described below and various pieces of information, such as communication parameters for wireless communication. Besides the memory such as a ROM or a RAM, the storage unit 201 can be configured with a storage medium, such as a flexible disk, a hard disk, an optical disk, a magneto optical disk, a CD-ROM, a CD-R, a magnetic tape, a non-volatile memory card, and a Digital Versatile Disc (DVD). The storage unit 201 can include, for example, a plurality of memories.

A control unit 202, which is configured with a processor, such as a central processing unit (CPU) or a micro processing unit (MPU), controls the entirety of the communication apparatus 101 by executing programs stored in the storage unit 201. The control unit 202 can be configured to control the entirety of the communication apparatus 101 by causing an operating system (OS) and a program stored in the storage unit 201 to cooperate with each other. Moreover, the control unit 202 can include a plurality of processors, such as a multi-core processor, and can be configured to control the entirety of the communication apparatus 101 using the plurality of processors. Additionally, the control unit 202 controls a function unit 203 to perform predetermined processing, such as image capturing or image projection.

The function unit 203 is hardware by which the communication apparatus 101 performs predetermined processing. For example, in a case where the communication apparatus 101 is a camera, the function unit 203 is an imaging unit and thus performs image capturing processing. Moreover, for example, in a case where the communication apparatus 101 is a mobile phone, the function unit 203 is a Long-Term Evolution (LTE) communication unit and thus performs LTE communication. Data to be processed by the function unit 203 can be data stored in the storage unit 201, or can be data received by communicating with an external communication apparatus via a communication unit 206, which is described below.

An input unit 204 receives various operations performed by the user. An output unit 205, which is, for example, a display unit or a speaker, performs output processing that is based on data stored in the storage unit 201 or data received from an external apparatus. More specifically, the output unit 205 performs at least one of, for example, displaying on a display screen, audio output by a speaker, and vibration output. Both the input unit 204 and the output unit 205 can be implemented as a single module like a touch panel.

The communication unit 206 performs control of wireless communication compliant with the IEEE 802.11 series and control of Internet Protocol (IP) control. Moreover, the communication unit 206 controls an antenna 207 to transmit and receive a wireless signal for wireless communication. The communication apparatus 101 communicates data on which output processing is performed by the output unit 205 with the external communication apparatus 102 or 103 via the communication unit 206. For example, the communication apparatus 101 transmits display screen data, which is displayed on a display screen serving as the output unit 205, to the external communication apparatus 102 or 103. Here, a communication compliant with Wi-Fi® Display is used for the transmission of the display screen data. Wi-Fi® Display is not limiting, but another communication method, such as Intel Wireless Display (WiDi), can be used.

In the following description, an example is described in which the communication apparatus 101 transmits or receives display screen data to or from the external communication apparatus 102. However, not only this, but the communication apparatus 101 can transmit or receive audio data, which is output to the output unit 205, to or from the external communication apparatus 102.

Figure 3:
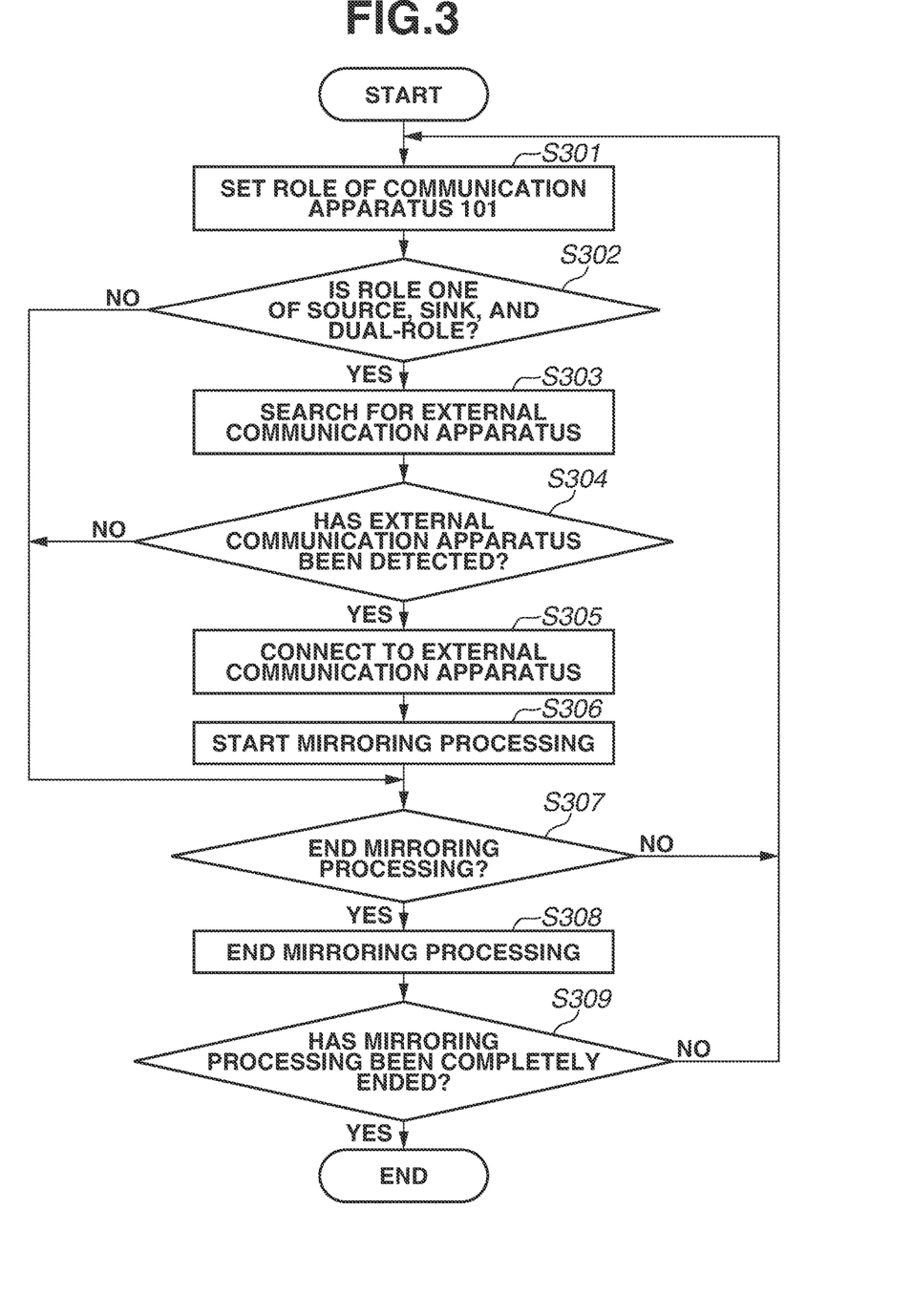
FIG. 3 is a flowchart illustrating processing performed when the communication apparatus performs mirroring processing of a monitor screen.

FIG. 3 is a flowchart illustrating the flow of processing implemented by the control unit 202 reading a program stored in the storage unit 201 and executing the program when the communication apparatus 101 communicates display screen data with the external communication apparatus 102 in conformity with Wi-Fi® Display. At least a part of the flowchart illustrated in FIG. 3 can be implemented by hardware. In a case where hardware is used for such implementation, for example, a predetermined compiler can be used to automatically produce a dedicated circuit on a Field Programmable Gate Array (FPGA) from a program for implementing each step. Moreover, a gate array circuit can be formed as with an FPGA for implementation as hardware. Additionally, an application specific integrated circuit (ASIC) can be used for implementation as hardware.

The flowchart illustrated in FIG. 3 is started when the function of Wi-Fi® Display is turned on by the user. The flowchart illustrated in FIG. 3 can be started in the following cases. For example, the cases include a case where a predetermined time has been reached, a case where it is determined by, for example, a global positioning system (GPS) that the communication apparatus 101 is present within a predetermined range, a case where a predetermined network has been detected, and the entire communication apparatus 101 has been powered on.

First, in step S301, the control unit 202 sets the role of the communication apparatus 101 to one of Source, Sink, Dual-Role, and Search Inhibition. Here, the term "role" refers to which of a source device, a sink device, and a dual-role device the communication apparatus 101 operates as in a case where the communication apparatus 101 connects to a new external communication apparatus, to search for the new external communication apparatus targeted for connection. In a case where the role is set to Search Inhibition, search processing described below is not performed.

For example, in the following description, if the role of the communication apparatus 101 is set to Source, the communication apparatus 101 operates as a source device and searches for an external communication apparatus to be newly connected to the communication apparatus 101. This does not hinder the communication apparatus 101 from operating as a sink device in relation to an external communication apparatus that is being connected to the communication apparatus 101.

Processing for setting the role in this step is performed without any user operation on the input unit 204. Details of the processing for setting the role are described below with reference to FIG. 4.

After the role is set, then in step S302, the control unit 202 determines whether the set role is one of Source, Sink, and Dual-Role. If the role is none of Source, Sink, and Dual-Role, in other words, if the role is set to Search Inhibition (NO in step S302), the processing proceeds to step S307 while omitting search processing and other processing performed in steps S303 to S306. On the other hand, if the role is one of Source, Sink, and Dual-Role (YES in step S302), then in step S303, the control unit 202 searches for an external communication apparatus based on the role set in step S301. Search for an external communication apparatus is performed by transmitting and receiving wireless signals, such as a beacon, a probe request, and a probe response, based on the Wi-Fi® Display specifications. Details of the search processing are described below with reference to FIG. 5.

Then, as a result of the search processing, in step S304, the control unit 202 determines whether an external communication apparatus that is not yet connected to the communication apparatus 101 has been detected. Here, in a case where both the role of the communication apparatus 101 set in step S301 and the role of the detected external communication apparatus are Source or Sink and thus coincide with each other, the communication apparatus 101 and the detected external communication apparatus are cannot transmit and receive display screen data to and from each other. Accordingly, in a case where both the role of the communication apparatus 101 and the role of the detected external communication apparatus are Source or Sink and thus coincide with each other, the control unit 202 determines that the external communication apparatus is not the detected one. In a case where both the role of the communication apparatus 101 and the role of the detected external communication apparatus are Dual-Role and thus coincide with each other, then, when both the roles are set to respective appropriate ones, the communication apparatus 101 and the external communication apparatus can transmit and receive display screen data to and from each other. Accordingly, in a case where both the role of the communication apparatus 101 and the role of the detected external communication apparatus are Dual-Role and thus coincide with each other, the control unit 202 determines that the external communication apparatus is the detected one.

In a case where it is determined by the above determination step that a plurality of external communication apparatus has been detected, one apparatus is selected and then subjected to connection processing. This selection can be performed based on an instruction from the user or can be automatically performed based on the number of times of connection or the timing of the last connection. In a case where the selection is performed based on an instruction from the user, the output unit 205 notifies the user of information about the detected external communication apparatus. Here, the output unit 205 is configured not to notify the user of information about an external communication apparatus the role of which is Source or Sink and coincides with the role of the communication apparatus 101 among the detected external communication apparatuses. This enables improving the convenience for the user to select an apparatus to be connected to the communication apparatus 101.

If any external communication apparatus that is not yet connected to the communication apparatus 101 has not been detected (NO in step S304), the processing proceeds to step S307. On the other hand, if an external communication apparatus that is not yet connected to the communication apparatus 101 has been detected (YES in step S304), then in step S305, the control unit 202 performs wireless connection processing with respect to the detected external communication apparatus.

In the wireless connection processing in step S305, the role of the communication apparatus 101 of operating as a source device or operating as a sink device is determined. Details of the wireless connection processing are described below with reference to FIG. 5. Then, in step S306, the control unit 202 communicates display screen data with the connected external communication apparatus and starts mirroring processing. The term "mirroring" refers to performing the same display on a display screen of the communication apparatus 101 and on a display screen of the connected external communication apparatus. In a case where the communication apparatus 101 operates as a source device, the communication apparatus 101 transmits display screen data, and the external communication apparatus receives the display screen data and displays the received display screen data on the display screen of the external communication apparatus. On the other hand, in a case where the communication apparatus 101 operates as a sink device, the external communication apparatus transmits display screen data, and the communication apparatus 101 receives the display screen data and displays the received display screen data on the display screen of the communication apparatus 101.

Then, in step S307, the control unit 202 determines whether to end the mirroring processing. Here, the control unit 202 performs the determination based on whether the input unit 204 has received a mirroring end instruction from the user. The mirroring end instruction is issued by selecting one or some apparatuses from among the external communication apparatuses which are performing mirroring processing with the communication apparatus 101 and specifying the selected apparatuses as targets for ending the mirroring processing. Instead of this instruction or in addition to this instruction, an instruction to end the mirroring processing itself can be issued. In this case, step S309, which is described below, can be omitted.

If the control unit 202 determines not to end mirroring processing (NO in step S307), the communication apparatus 101 continues mirroring processing and the processing returns to step S301 in preparation for wireless connection processing with another external communication apparatus. On the other hand, if the control unit 202 determines to end mirroring processing (YES in step S307), then in step S308, the communication apparatus 101 disconnects communication with the selected external communication apparatus, thus ending the mirroring processing. In a case where an instruction to end the mirroring processing itself is issued, the communication apparatus 101 disconnects communication with all of the external communication apparatuses which are performing mirroring processing, thus ending the mirroring processing itself.

After that, in step S309, the control unit 202 determines whether the mirroring processing performed by the communication apparatus 101 has been entirely ended. Instead of performing this determination, the control unit 202 can determine whether an instruction to end the mirroring processing itself performed by the communication apparatus 101 has been issued. Such an instruction can be issued at the time in step S307 or can be issued at the time in step S309.

If the mirroring processing performed by the communication apparatus 101 has been entirely ended (YES in step S309), the processing illustrated in FIG. 3 ends. If the mirroring processing is continued (NO in step S309), the processing returns to step S301.

Figure 4:
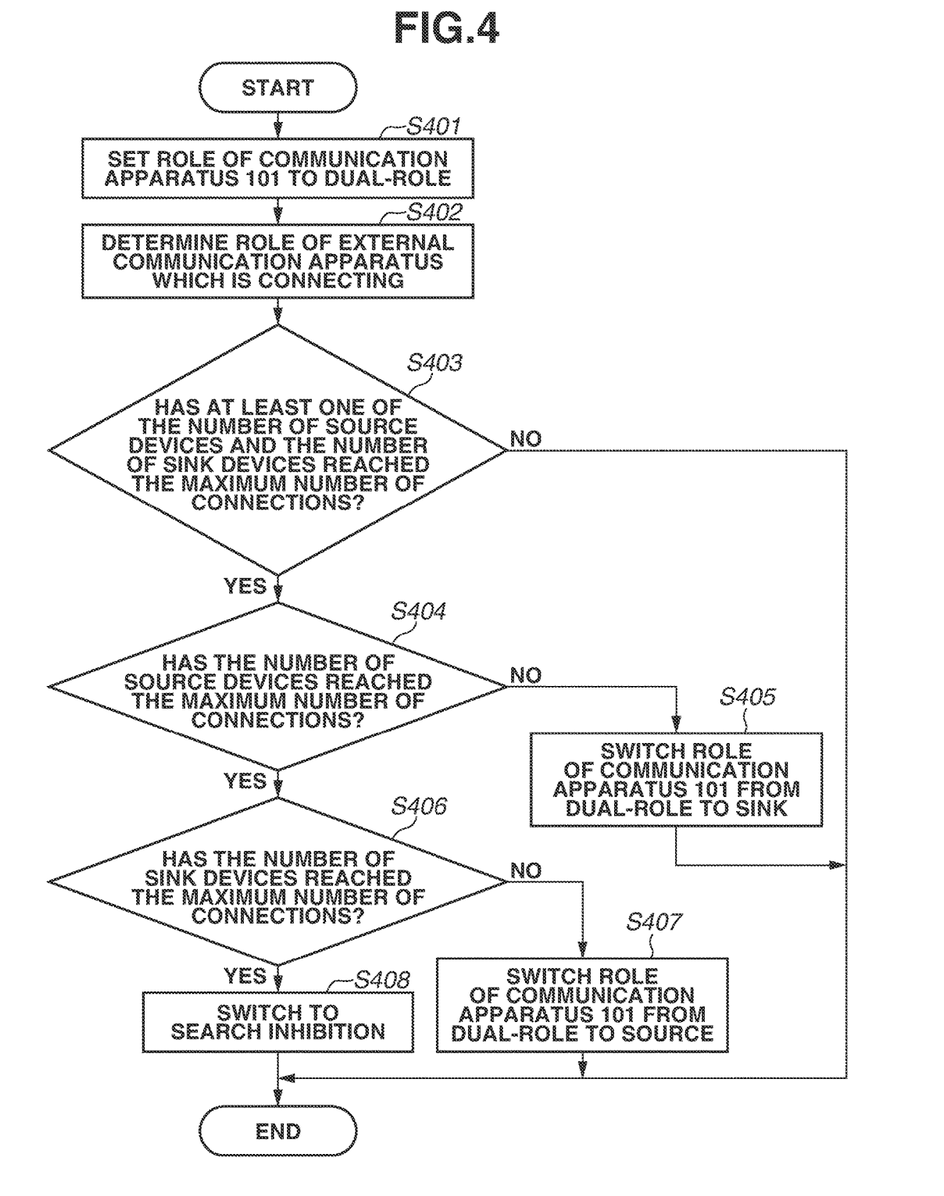
FIG. 4 is a flowchart illustrating processing performed when the communication apparatus switches its roles.

Next, the above-mentioned step S301, i.e., the processing for setting the role, is described with reference to FIG. 4. First, in step S401, the control unit 202 sets the role of the communication apparatus 101 as a dual-role device. Then, in step S402, the control unit 202 determines whether the external communication apparatus which is connecting to the communication apparatus 101 is operating as a source device or is operating as a sink device. In other words, the control unit 202 determines the role of the external communication apparatus which is connecting to the communication apparatus 101. Here, in a case where a plurality of external communication apparatuses is connecting to the communication apparatus 101, the control unit 202 performs the determination with respect to each external communication apparatus.

Then, in step S403, the control unit 202 determines, based on a result of the determination in step S402, whether the number of apparatuses operating as a source device among the external communication apparatus which are connecting to the communication apparatus 101 has reached the maximum number of connections or the number of apparatuses operating as a sink device has reached the maximum number of connections. Since the maximum numbers of connections indicate threshold values for the respective functions, the maximum numbers of connections can be respective different values. If the number of apparatuses has reached neither of the maximum numbers of connections (NO in step S403), the processing illustrated in FIG. 4 ends. Thus, the communication apparatus 101 is set as a dual-role device.

On the other hand, if the number of apparatuses has reached at least one of the maximum numbers of connections (YES in step S403), then in step S404, the control unit 202 determines whether the number of apparatuses operating as a source device among the external communication apparatus which are connecting to the communication apparatus 101 has reached the maximum number of connections. If it is determined that the number of apparatuses operating as a source device has not reached the maximum number of connections (NO in step S404), i.e., if it is determined that the number of apparatuses operating as a sink device has reached the maximum number of connections, then in step S405, the control unit 202 switches the role of the communication apparatus 101 from Dual-Role to Sink. Thus, the communication apparatus 101 is set as a sink device. With this, since the communication apparatus 101 does not perform search while operating as a source device, the communication apparatus 101 does not any more connect to an external communication apparatus which operates as a sink device. Accordingly, the possibility that the communication apparatus 101 would perform wireless connection processing with sink devices beyond the maximum number of connections can be reduced.

On the other hand, if it is determined that the number of apparatuses operating as a source device has reached the maximum number of connections (YES in step S404), then in step S406, the control unit 202 determines whether the number of apparatuses operating as a sink device among the external communication apparatus which are connecting to the communication apparatus 101 has reached the maximum number of connections. If it is determined that the number of apparatuses operating as a sink device has not reached the maximum number of connections (NO in step S406), i.e., if it is determined that only the number of apparatuses operating as a source device has reached the maximum number of connections, then in step S407, the control unit 202 switches the role of the communication apparatus 101 from Dual-Role to Source. Thus, the communication apparatus 101 is set as a source device. With this, since the communication apparatus 101 does not perform search while operating as a sink device, the communication apparatus 101 does not any more connect to an external communication apparatus which operates as a source device. Accordingly, the possibility that the communication apparatus 101 would perform wireless connection processing with source devices beyond the maximum number of connections can be reduced.

On the other hand, if it is determined that the number of apparatuses operating as a sink device has reached the maximum number of connections (YES in step S406), i.e., if it is determined that each of the number of apparatuses operating as a sink device and the number of apparatuses operating as a source device has reached the maximum number of connections, then in step S408, the control unit 202 sets the communication apparatus 101 to Search Inhibition. In this case, the communication apparatus 101 does not perform search processing. Moreover, the output unit 205 can display information indicating that both source devices and sink devices have reached the maximum number of connections, thus notifying the user that the communication apparatus 101 can no longer connect to an external communication apparatus.

In this way, automatically setting the role of the communication apparatus 101 enables performing search processing with the appropriate role without requiring a user operation.

Figure 5:
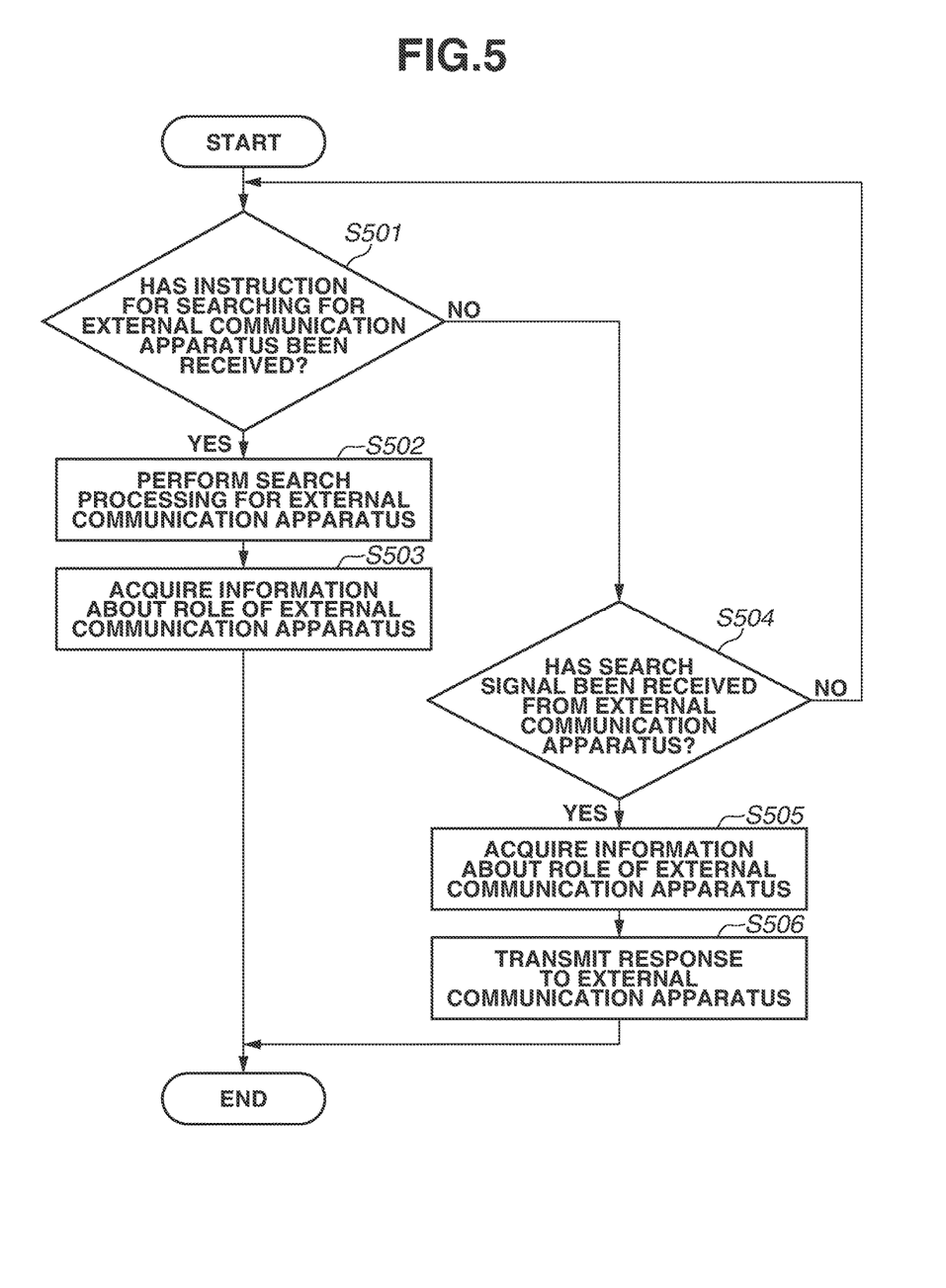
FIG. 5 is a flowchart illustrating processing performed when the communication apparatus detects an external communication apparatus.

Next, the search processing in step S303 is described in detail with reference to the flowchart of FIG. 5. First, in step S501, the control unit 202 determines whether an instruction for searching for an external communication apparatus has been received from the user. This instruction is an instruction to cause the communication apparatus 101, which has been only waiting for being searched for by an external apparatus conforming to Wi-Fi® Display, to transmit a signal so as to actively perform searches.

In a case where, in step S301, the role of the communication apparatus 101 is set to Source or Dual-Role, step S501 can be omitted so that the processing can automatically proceed to step S502. In this instance, in a case where, in step S301, the role of the communication apparatus 101 is set to Sink, step S501 can be omitted so that the processing can automatically proceed to step S504.

If it is determined that the search instruction has been received (YES in step S501), then in step S502, the control unit 202 performs search processing for an external communication apparatus. In a case where the communication apparatus 101 searches for an external communication apparatus, the communication apparatus 101 transmits a probe request compliant with the IEEE 802.11 series while changing wireless LAN channels based on the Wi-Fi Display specifications. Then, the communication apparatus 101 receives a probe response from an external communication apparatus which has responded to the probe request, thus detecting an external communication apparatus compliant with the IEEE 802.11 series.

Upon detecting an external communication apparatus, the control unit 202 sets information about the role set in the above-mentioned step S301 (one of Source, Sink, and Dual-Role) to the item "device-type" of a Wi-Fi® Display Information Element (WFD IE) in a wireless signal compliant with Wi-Fi® Display.

Then, the communication apparatus 101 transmits a wireless signal including the WFD IE in which the role information is set to the device-type. Information about a connecting condition of the communication apparatus 101, such as the maximum number of connections of source devices and the maximum number of connections of sink devices, can be set in the WFD IE. An external communication apparatus can determine the allowance or denial of communication and to control a connection method based on the information about the connecting state. For example, in a case where the maximum number of connections of sink devices is one, since multi-channel audio data cannot be received by a plurality of speakers (sink devices), an external communication apparatus which operates as a sink device can be prevented from connecting to the communication apparatus 101.

Then, in step S503, the control unit 202 acquires information about the role (role information) of an external communication apparatus. Here, the control unit 202 acquires the role information by referring to the device-type in the WFD IE included in a wireless signal, such as a probe response, received from an external communication apparatus. The role information contains information indicating whether the external communication apparatus is a sink device or a dual-role device.

In addition to this processing, the communication apparatus 101 can perform service discovery compliant with Wi-Fi® Display. More specifically, in a case where the communication apparatus 101 operates as a sink device, the communication apparatus 101 functions as a service advertiser. The service advertiser performs broadcasting of information about a function which the communication apparatus 101 can supply. Then, the service advertiser waits for a connection request transmitted from the other-party apparatus. On the other hand, in a case where the communication apparatus 101 operates as a source device, the communication apparatus 101 functions as a service seeker. The service seeker searches for a service advertiser that sends information about a service which the communication apparatus 101 intends to use, and performs unicast transmission of a connection request containing function information. In a case where the communication apparatus 101 is a dual-role device, the communication apparatus 101 functions as both a service seeker and a service advertiser. In other words, the communication apparatus 101 performs not only broadcasting but also unicast transmission of function information about the communication apparatus 101.

A search for an external communication apparatus can be performed not only by the above-mentioned method but also by performing a communication in a communication method different from the IEEE 802.11 series, such as Near Field Communication (NFC) or Bluetooth®.

On the other hand, if, in step S501, it is determined that a search instruction for an external communication apparatus has not been received from the user (NO in step S501), then in step S504, the control unit 202 determines whether a search signal has been received from an external communication apparatus. Here, the search signal is a probe request from an external communication apparatus. However, not only this, but the search signal can be a beacon signal which an external communication apparatus transmits.

If, in step S504, it is determined that no search signal from an external communication apparatus has been received (NO in step S504), the processing returns to step S501, in which the control unit 202 waits for a search instruction from the user again. On the other hand, if it is determined that a search signal from an external communication apparatus has been received (YES in step S504), then in step S505, the control unit 202 acquires information about the role of the external communication apparatus. The information about the role (role information) of the external communication apparatus can be acquired by referring to the device-type in the WFD IE contained in a wireless signal, such as a probe request received from the external communication apparatus or a service discovery request prescribed by the Wi-Fi® Display standard. One of Source, Sink, and Dual-Role is set in the role information.

Then, in step S506, the control unit 202 transmits a response to the external communication apparatus. The response is a wireless signal, such as a probe response to a probe request received from the external communication apparatus or a service discovery response to a service discovery request received from the external communication apparatus. As in the above-mentioned step S502, the connecting state of the communication apparatus 101, such as the maximum number of connections of source devices or the maximum number of connections of sink devices which are currently connectable, can be set in a predetermined field in the WFD IE contained in the response. Moreover, the communication apparatus 101 does not transmit a response to an external communication apparatus the role of which is Source or Sink and coincides with that of the communication apparatus 101.

In this way, the search processing can be appropriately performed according to the role of the communication apparatus 101 set in step S301.

Next, wireless connection processing is described with reference to FIG. 6. In a case where the role of an external communication apparatus is Source or Sink and coincides with the role of the communication apparatus 101, since it is determined that the external communication apparatus is not the detected one, in the following description, such an external communication apparatus is assumed not to serve as a connection partner.

First, in step S601, the control unit 202 determines whether the role of the external communication apparatus serving as a connection partner acquired in step S503 or S505 (hereinafter referred to as an "other-party apparatus")

is Source. If the role of the other-party apparatus is Source (YES in step S601), the control unit 202 advances the processing to step S602 so as to set the role of the communication apparatus 101 to Sink and cause the communication apparatus 101 to connect to the other-party apparatus.

In step S602, to set the role of the communication apparatus 101 to Sink and cause the communication apparatus 101 to connect to the other-party apparatus, the control unit 202 changes the role information contained in a wireless signal to be transmitted to Sink and performs connection setup. The device-type in the WFD IE is used for setting of the role information as mentioned above. Moreover, the connection setup is performed based on the Wi-Fi® Display specifications.

Then, in step S603, the control unit 202 sets the role of the communication apparatus 101 to Sink and performs capability exchange signaling and negotiation with the other-party apparatus. In the Wi-Fi® Display specifications, the use of the Real Time Streaming Protocol (RTSP) is prescribed for capability exchange signaling and negotiation, and predetermined messages including RTSP M1 to RTSP M4 are exchanged with the other-party apparatus. The RTSP is a protocol used to control streaming, and the Transmission Control Protocol (TCP) is typically used as a lower layer transport protocol. In the case of functioning as Sink, the communication apparatus 101 starts processing with reception of an RTSP M1 request transmitted from the other-party apparatus.

Lastly, in step S604, the control unit 202 establish a session while setting the role of the communication apparatus 101 to Sink, and starts processing for receiving and playing back display screen data. In the Wi-Fi® Display specifications, predetermined messages including RTSP M5 to RTSP M7 are exchanged with the other-party apparatus to establish a session and start playback. In the case of functioning as Sink, the communication apparatus 101 starts processing with reception of an RTSP M5 request transmitted from the other-party apparatus.

On the other hand, if, in step S601, it is determined that the role of the other-party apparatus is not Source (NO in step S601), i.e., if the role of the other-party apparatus is Sink or Dual-Role, then in step S605, the control unit 202 determines whether the role of the communication apparatus 101 is Sink.

If, in step S605, it is determined that the role of the other-party apparatus is Sink (YES in step S605), the control unit 202 advances the processing to step S606 so as to set the role of the communication apparatus 101 to Source and cause the communication apparatus 101 to connect to the other-party apparatus. In step S606, to set the role of the communication apparatus 101 to Source and cause the communication apparatus 101 to connect to the other-party apparatus, the control unit 202 changes the role information contained in a wireless signal to be transmitted to Source and performs connection setup. Here, the type of a wireless signal used for connection setup is also similar to that described in Step S602, and is, therefore, omitted from the description.

Then, in step S607, the control unit 202 sets the role of the communication apparatus 101 to Source and performs capability exchange signaling and negotiation with the other-party apparatus. In the capability exchange signaling and negotiation, as in step S603 described above, messages including RTSP M1 to RTSP M4 are exchanged with the other-party apparatus, and, in the case of functioning as Source, the communication apparatus 101 starts processing with transmission of an RTSP M1 request to the other-party apparatus.

Lastly, in step S608, the control unit 202 establish a session while setting the role of the communication apparatus 101 to Source, and starts processing for transmitting and playing back display screen data. In the establishment of a session and the start of playback, as in step S604 described above, messages including RTSP M5 to RTSP M7 are exchanged with the other-party apparatus, and, in the case of functioning as Source, the communication apparatus 101 starts processing with transmission of an RTSP M5 request to the other-party apparatus.

Next, a case where, in step S605, it is determined that the role of the other-party apparatus is not Sink (NO in step S605) is described. In this case, both the role of the communication apparatus 101 and the role of the other-party apparatus are Dual-Role. In such a case, then in step S609, the control unit 202 displays a role selection screen on the output unit 205 to allow the user to select the role of the communication apparatus 101 via the input unit 204. The role selection screen is configured to display two roles of screen transmission (Source) and screen reception (Sink) and not to display a role of Dual-Role. This enables the user to optionally select one of roles of Source and Sink.

In a case where a user for the other-party apparatus has specified the role thereof, the ole selection screen can be ended. In this case, if the other-party apparatus has been specified as Source, the communication apparatus 101 serves as Sink. If the other-party apparatus has been specified as Sink, the communication apparatus 101 serves as Source. In this way, the roles of the communication apparatus 101 and the other-party apparatus can be determined only by a role selection operation on one of the two apparatuses.

After, in step S609, the user has selected the role of the communication apparatus 101, then in step S610, the control unit 202 determines what is the selected role. If, in step S610, it is determined that the selected role is Sink, the control unit 202 advances the processing to step S602 so as to set the role of the communication apparatus 101 to Sink and cause the communication apparatus 101 to connect to the other-party apparatus. Details of the connection processing performed here are as described above, and are, therefore, omitted from the description. On the other hand, if, in step S610, it is determined that the selected role is Source, the control unit 202 advances the processing to step S606 so as to set the role of the communication apparatus 101 to Source and cause the communication apparatus 101 to connect to the other-party apparatus. Details of the connection processing performed here are as described above, and are, therefore, omitted from the description.

Figure 6:
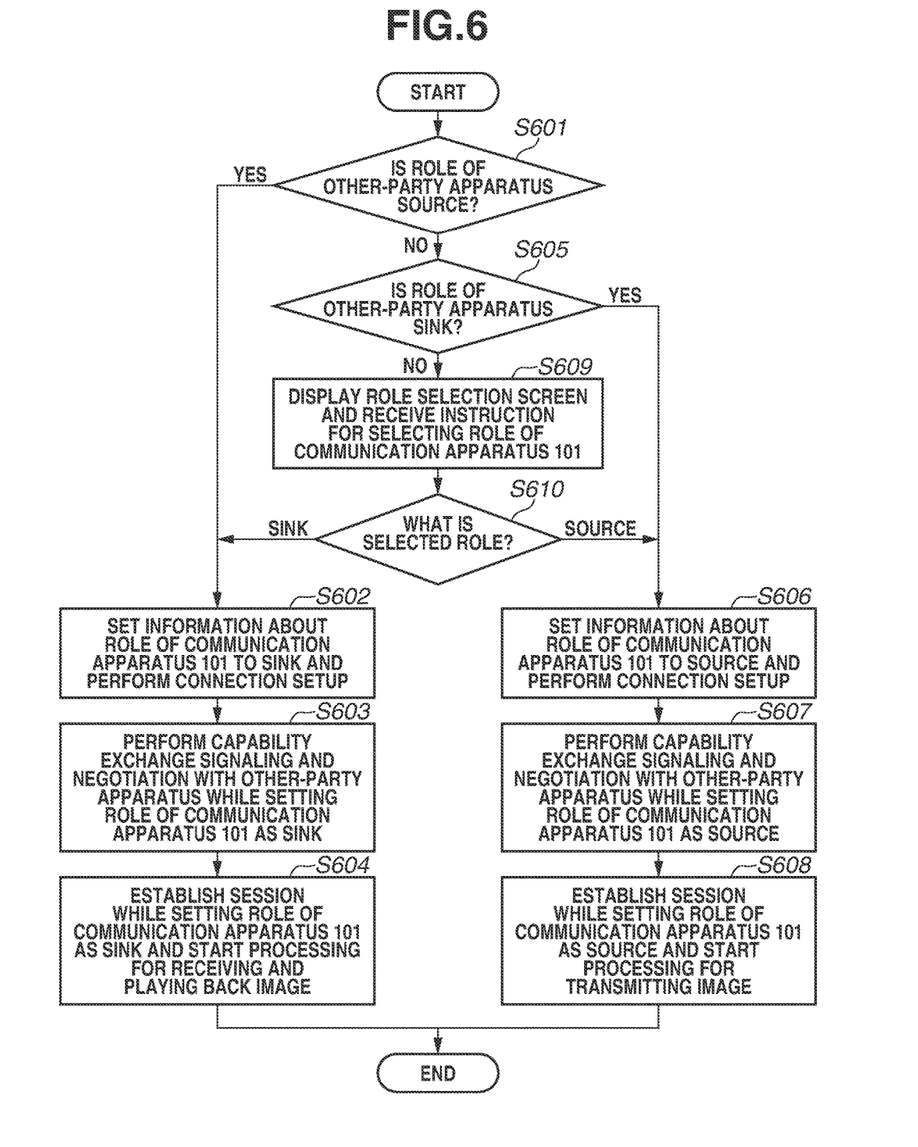
FIG. 6 is a flowchart illustrating processing performed when the communication apparatus connects to an external communication apparatus.

In this way, according to the connection processing illustrated in the flowchart of FIG. 6, even in a case where the communication apparatus 101 has a concurrent dual-role function, the role of the communication apparatus 101 is determined without the user performing a role switching operation on the input unit 204 or with the user performing a simple operation, thus enabling the communication apparatus 101 to connect to the other-party apparatus.

Next, connection processing performed in the entire system, which includes the communication apparatus 101 and the external communication apparatuses 102 and 103, according to the present exemplary embodiment is described with reference to FIG. 7 and FIG. 8.

Figure 7:
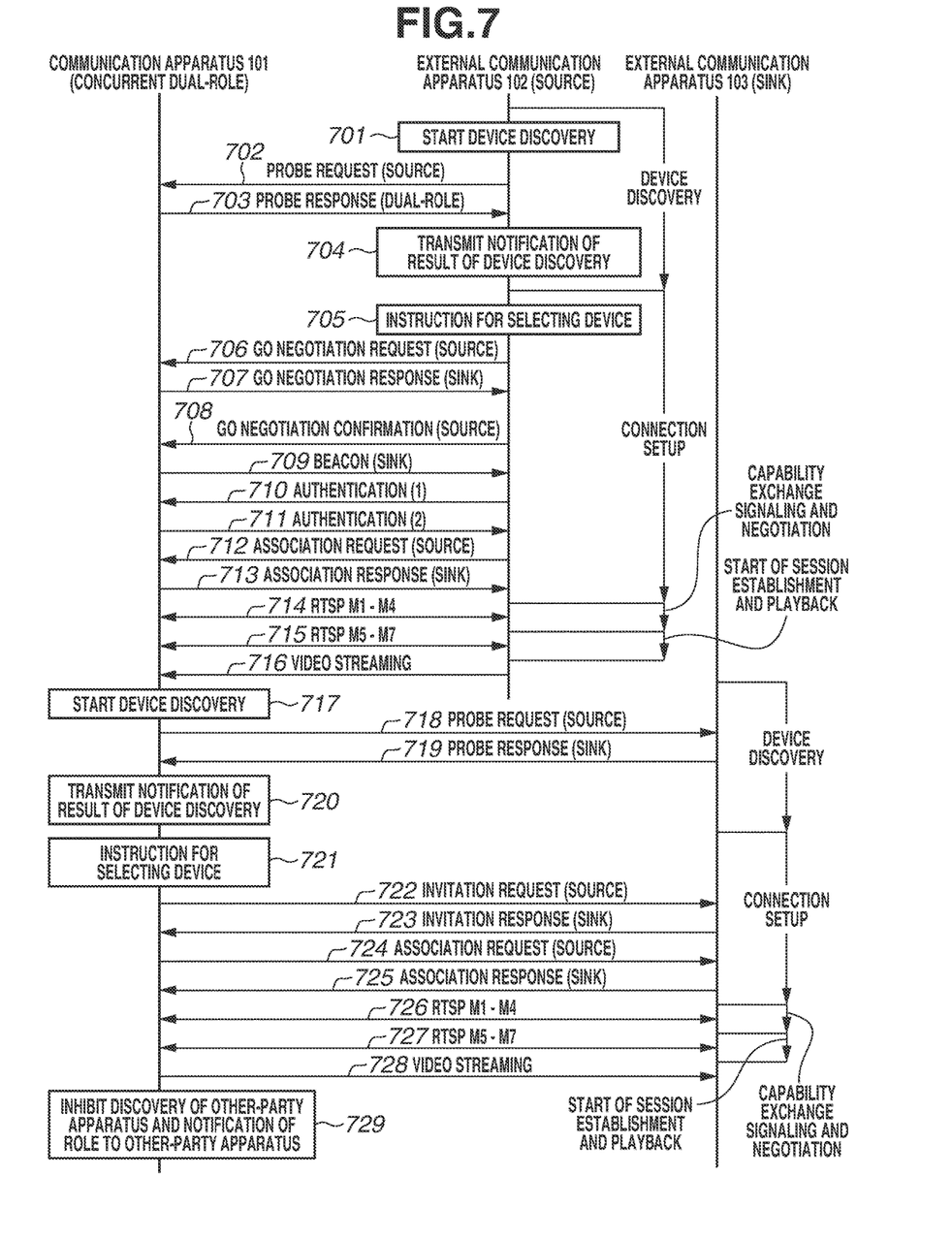
FIG. 7 is a sequence chart illustrating processing performed when the communication apparatus connects to an external communication apparatus.

FIG. 7 is a sequence chart in a case where the communication apparatus 101 connects to the external communication apparatus 102 serving as a source device and the external communication apparatus 103 serving as a sink device in a concurrent manner.

Here, each apparatus executes a sequence compliant with Wi-Fi® Display. First, the communication apparatus 101 performs device discovery (701 to 704 and 717 to 720), and then performs connection setup (705 to 713 and 721 to 725). Then, the communication apparatus 101 performs capability exchange signaling and negotiation (714 and 726) to establish a session. After that, the communication apparatus 101 starts playback (715 and 727), so that video streaming (716 and 728) is performed. In the option specifications of Wi-Fi® Display, while, for example, a step of discovering a service before the connection setup (705 to 713 and 721 to 725) is prepared, in the present exemplary embodiment, for ease of explanation, such a step is not used. Moreover, since, as mentioned above, the communication apparatus 101 can concurrently assume the role of Source and the role of Sink, each of the number of connectable other-party source devices and the number of connectable other-party sink devices is necessarily at least one. In the present exemplary embodiment, for ease of explanation, as the capability of the communication apparatus 101, each of the maximum number of connectable other-party source devices and the maximum number of connectable other-party sink devices is deemed to be one.

First, the communication apparatus 101 and the external communication apparatus 102 perform steps for device discovery (701 to 704). Here, in the external communication apparatus 102, a user thereof issues an instruction to start a search for another apparatus (701). When the instruction to start a search is issued, the external communication apparatus 102 transmits a probe request (702) and receives a probe response (703) with respect to the communication apparatus 101. Even when the instruction to start a search is issued in the communication apparatus 101, the communication apparatus 101 similarly transmits a probe request and receives a probe response. Wireless signals to be transmitted and to be received are prescribed in the Wi-Fi® Peer-to-Peer specifications, and, for example, a beacon signal can also be used. Moreover, since the external communication apparatus 102 has a source function, Source is set as role information in the probe request (702) transmitted from the external communication apparatus 102.

On the other hand, since the communication apparatus 101 has a dual-role function, Dual-Role is set as role information in the probe response (703) transmitted from the communication apparatus 101. The external communication apparatus 102 detects the communication apparatus 101 by receiving the probe response (703) transmitted from the communication apparatus 101, and notifies the user of the external communication apparatus 102 of a result of device discovery (704).

In steps for connection setup of the communication apparatus 101 and the external communication apparatus 102 (705 to 713), first, the user of the external communication apparatus 102 selects the communication apparatus 101 from a list of discovered devices (705). After that, the external communication apparatus 102 and the communication apparatus 101 transmit and receive predetermined wireless signals (706 to 713) to perform connection setup. Wireless signals to be transmitted and to be received are also prescribed in the Wi-Fi® Peer-to-Peer specifications, and the wireless signal described in the above-mentioned step S602 can also be used besides the signals 706 to 713. Moreover, although the communication apparatus 101 has a dual-role function, since the communication apparatus 101 becomes aware that the external communication apparatus 102 has a source function from the role information contained in the received probe request (702), the communication apparatus 101 functions as Sink. Accordingly, Sink instead of Dual-Role is set as the role information in the wireless signals (707, 709, and 713) transmitted from the communication apparatus 101. On the other hand, Source is set as the role information in the wireless signals (706, 708, and 712) transmitted from the external communication apparatus 102.

Next, a step for capability exchange signaling and negotiation (714) and a step for session establishment and playback start (715) are performed between the communication apparatus 101 and the external communication apparatus 102. These steps are as described above in the above-mentioned steps S603 and S604, respectively. In other words, the communication apparatus 101 and the external communication apparatus 102 transmit and receive predetermined RTSP messages prescribed in the Wi-Fi® Display specifications, and then, video streaming (716) is started from the external communication apparatus 102 to the communication apparatus 101.

Next, a step for device discovery (717 to 720) is performed between the communication apparatus 101 and the external communication apparatus 103. More specifically, when an instruction for search start is issued in the communication apparatus 101 (717), the communication apparatus 101 transmits a probe request (718) to the external communication apparatus 103 and receives a probe response (719) from the external communication apparatus 103. Although the communication apparatus 101 has a concurrent dual-role function, since the communication apparatus 101 is unable to operate as a sink device because of connecting to the external communication apparatus 102 in advance, Source is set as the role information in the probe request (718) transmitted from the communication apparatus 101. On the other hand, since the external communication apparatus 103 has a sink function, Sink is set as the role information in the probe response (719) transmitted from the external communication apparatus 103. The communication apparatus 101 detects the external communication apparatus 103 by receiving the probe response (719) transmitted from the external communication apparatus 103, and notifies the user of a result of device discovery (720).

In steps for connection setup of the communication apparatus 101 and the external communication apparatus 103 (721 to 725), the user of the communication apparatus 101 is allowed to select the external communication apparatus 103 from a list of detected devices (721). After the selection is performed, the communication apparatus 101 and the external communication apparatus 103 transmit and receive predetermined wireless signals (722 to 725) to perform connection setup. Although the communication apparatus 101 has a dual-role function, since the communication apparatus 101 becomes aware that the external communication apparatus 103 has a sink function from the role information contained in the received probe request (719), the communication apparatus 101 functions as Source. Accordingly, Source instead of Dual-Role is set as the role information in the wireless signals (722 and 724) transmitted from the communication apparatus 101. On the other hand, Sink is set as the role information in the wireless signals (723 and 725) transmitted from the external communication apparatus 103.

A step for capability exchange signaling and negotiation (726) and a step for session establishment and playback start (727) between the communication apparatus 101 and the external communication apparatus 103 are as described above in the above-mentioned steps S607 and S608, respectively. In other words, the communication apparatus 101 and the external communication apparatus 103 transmit and receive predetermined RTSP messages prescribed in the Wi-Fi® Display specifications, and then, video streaming (728) is started from the communication apparatus 101 to the external communication apparatus 103.

In a case where, as mentioned above, each of the maximum number of connectable other-party source devices and the maximum number of connectable other-party sink devices as the capability of the communication apparatus 101 is one, the communication apparatus 101 is in a state of having reached the maximum number of connections for both a source device and a sink device. Therefore, the communication apparatus 101 inhibits subsequent discovery of other-party apparatuses and subsequent notification of a role to other-party apparatuses (729).

While, in FIG. 7, the role of the external communication apparatus 103 is illustrated as Sink, the above description is also applicable to a case where the role is Dual-Role. More specifically, except that the role set in a wireless signal to be transmitted from the external communication apparatus 103 during device discovery (for example, the probe response (719)) is changed to Dual-Role, the other wireless signals, messages, and data to be transmitted and received between the communication apparatus 101 and the external communication apparatus 103 are the same as those described above.

Figure 8:
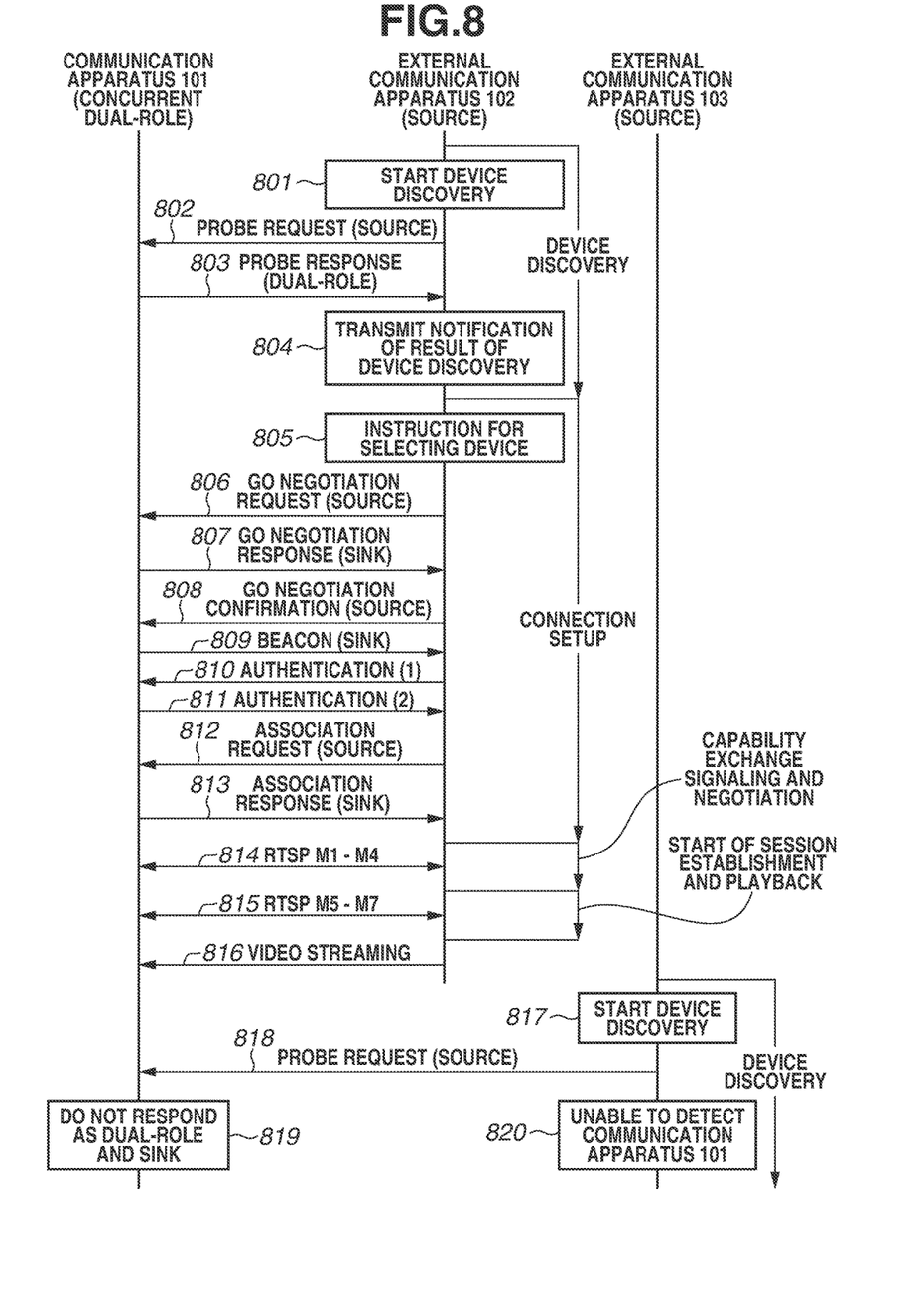
FIG. 8 is a sequence chart illustrating processing performed when the communication apparatus connects to an external communication apparatus.

Next, FIG. 8 is a sequence chart in a case where the communication apparatus 101 connects to the external communication apparatus 102 and the external communication apparatus 103 each serving as a source device in a concurrent manner.

The connection sequence between the communication apparatus 101 and the external communication apparatus 102 (801 to 816) is similar to the connection sequence between the communication apparatus 101 and the external communication apparatus 102 (701 to 716) illustrated in FIG. 7, and is, therefore, omitted from the description.

Unlike the sequence illustrated in FIG. 7, in a step for device discovery between the communication apparatus 101 and the external communication apparatus 103, when an instruction to start a search is issued in the external communication apparatus 103 (817), the external communication apparatus 103 transmits a probe request (818) and the communication apparatus 101 receives the probe request (818). Since the external communication apparatus 103 has a source function, Source is set as the role information in the probe request (818) transmitted from the external communication apparatus 103.

On the other hand, although the communication apparatus 101 has a concurrent dual-role function, since the communication apparatus 101 is unable to operate as a sink device because of connecting to the external communication apparatus 102 in advance, the communication apparatus 101 does not respond to the probe request (818) transmitted from the external communication apparatus 103 (819). In this way, since the external communication apparatus 103 receives no probe response from the communication apparatus 101, the external communication apparatus 103 cannot detect the communication apparatus 101 (820). Accordingly, information about the communication apparatus 101 is not included in a notification of a result of device discovery performed by the external communication apparatus 103, so that the external communication apparatus 103 cannot proceed to a step for connection setup with the communication apparatus 101.

While, in the above description, each of the maximum number of connectable other-party source devices and the maximum number of connectable other-party sink devices as the capability of the communication apparatus 101 is one as mentioned above, in a case where it is two or more, the communication apparatus 101 can continue to function as a dual-role device.

As described above, as a result of control processing for switching communication modes of a communication apparatus according to the present exemplary embodiment, a communication mode is determined according to a connecting state of the communication apparatus and the role of an external communication apparatus. In a case where the role of an other-party apparatus is Dual-Role, the user can select the role. Accordingly, in a case where a dual-role device concurrently assumes both of the roles of a source device and a sink device, the role of the communication apparatus is determined automatically or by a simple operation before discovery of a device, so that user convenience can be enhanced.

While the exemplary embodiment has been described in detail above, additional embodiments can be embodied as, for example, a system, an apparatus, a method, a program, or a recording medium (storage medium). More specifically, embodiments can be applied to a system configured with a plurality of devices, e.g., a host computer, an interface device, an imaging apparatus, or a web application, or can be applied to an apparatus configured with a single device.

Embodiments can also be implemented by performing processing for supplying a program implementing one or more of the functions of the above-described exemplary embodiment to a system or apparatus via a network or a storage medium and causing one or more processors included in the system or apparatus to read and execute the program. Moreover, embodiments can also be implemented by a circuit that implements one or more of the functions (for example, an application specific integrated circuit (ASIC)).

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, an apparatus including both the function of transmitting data to an external apparatus and the function of performing output processing based on received data is enabled to perform a notification adapted to a situation.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016374 filed Jan. 29, 2016, which is hereby incorporated by reference herein in its entirety.

What is claimed is:

1. A communication apparatus comprising:
one or more processors; and
one or more memories including instructions that, when executed by the one or more processors, cause the apparatus to:
transmit a first signal in a case where the communication apparatus is connected to first predetermined number of source devices defined by a Wi-Fi Miracast standard and where the communication apparatus is not connected to second predetermined number of sink devices defined by the Wi-Fi Miracast standard, the first signal indicating the communication apparatus operates as the source device;
transmit a second signal in a case where the communication apparatus is not connected to the first predetermined number of the source devices and where the communication apparatus is connected to the second predetermined number of sink devices, the second signal indicating that the communication apparatus operates as the sink device;
transmit a third signal in a case where the communication apparatus is not connected to the first predetermined number of the source devices nor to the second predetermined number of the sink devices, the third signal indicating that the communication apparatus operates as a dual-role device that is capable of operating both as the source device and as the sink device; and
establish a connection to an external communication apparatus that has responded to any of the first, second, or third signals.

2. The communication apparatus according to claim 1, further comprising a display unit configured to display an image,
Wherein, in a case where the communication apparatus operates as the sink device, the communication apparatus receives, from the external communication apparatus, a signal for causing the display unit to display an image displayed by the external communication apparatus.

3. The communication apparatus according to claim 1, further comprising a speaker configured to play audio,
wherein, in a case where the communication apparatus operates as the source device, the communication apparatus transmits a signal for causing the external communication apparatus to play the audio played by the speaker, and
wherein, in a case where the communication apparatus operates as the sink device, the communication receives, from the external communication apparatus, a signal for causing the speaker to play audio played by the external communication apparatus.

4. The communication apparatus according to claim 1, wherein,
in a case where the communication apparatus transmits the first signal, the communication apparatus gets connected to the external communication apparatus by transmitting a connection request, and
in a case where the communication apparatus transmits the second signal, the communication apparatus gets connected to the external communication apparatus by waiting for and receiving a connection request from the external communication apparatus.

5. The communication apparatus according to claim 4, wherein, in a case where the communication apparatus transmits the third signal, the communication apparatus transmits a connection request and waiting for and receives a connection request from the external communication apparatus.

6. The communication apparatus according to claim 1, wherein the communication apparatus acquires information indicating which of the source device and the sink device the external communication apparatus operates as.

7. The communication apparatus according to claim 6, wherein the communication apparatus acquires the information by receiving a beacon, a probe request, a probe response, a service discovery request, or a service discovery response transmitted from the external communication apparatus.

8. The communication apparatus according to claim 1,
wherein the first signal, the second signal, and the third signal are wireless signals conforming to an IEEE802.11 series.

9. The communication apparatus according to claim 7,
wherein the information is included in a wireless signal that conforms to
Near Field Communication or Bluetooth® and is transmitted from the external communication apparatus.

10. The communication apparatus according to claim 1, wherein, in a case where the communication apparatus transmits the third signal, the communication apparatus selects whether to operate as the source device or to operate as the sink device depending on whether the external communication apparatus is the source device or the sink device.

11. The communication apparatus according to claim 10, wherein the communication apparatus selects to operate as the sink device in a case where
the external communication apparatus is the source device and selects to operate as the source device in a case where the external communication apparatus is the sink device.

12. The communication apparatus according to claim 1, wherein the communication apparatus
transmits the first signal by broadcast, and
transmits the second signal by unicast.

13. The communication apparatus according to claim 1, wherein the communication apparatus transmits the third signal by broadcast and by unicast.

14. The communication apparatus according to claim 1, wherein the communication apparatus notifies a user of information about the external communication apparatus.

15. A control method for a communication apparatus, the control method comprising:
determining a function included in a first external communication apparatus that is connecting to the communication apparatus;

transmitting a first signal in a case where the communication apparatus is connected to a first predetermined number of source devices defined by a Wi-Fi Miracast standard and where the communication apparatus is not connected to second predetermined number of sink devices defined by the Wi-Fi Miracast standard, the first signal indicating that the communication apparatus operates as the source device;

transmitting a second signal in a case where the communication apparatus is not connected to the first predetermined number of the source devices and where the communication apparatus is connected to the second predetermined number of the sink devices, the second signal indicating that the communication apparatus operates as the sink device; and transmitting a third signal in a case where the communication apparatus is not connected to the first predetermined number of the source devices nor to the second predetermined number of the sink devices, the third signal indicating that the communication apparatus operates as a dual-role device that is capable of operating both as the source device and as the sink device; and establishing a connection to the external communication apparatus that has responded to any of the first signal, the second signal, and the third signal.

16. A non-transitory computer-readable storage medium storing computer-executable instructions that cause a computer to execute a control method for a communication apparatus, the control method comprising:

transmitting a first signal in a case where the communication apparatus is connected to the first predetermined number of source devices defined by a Wi-Fi Miracast standard and where the communication apparatus is not connected to second predetermined number of sink devices defined by the Wi-Fi Miracast standard, the first signal indicating that the communication apparatus operates as the source device;

transmitting a second signal in a case where the communication apparatus is not connected to the first predetermined number of the source devices and where the communication apparatus is connected to the second predetermined number of the sink devices, the second signal indicating that the communication apparatus operates as the sink device; and transmitting a third signal in a case where the communication apparatus is not connected to the first predetermined number of the source devices nor to the second predetermined number of the sink devices, the third signal indicating that the communication apparatus operates as a dual-role device that is capable of operating both as the source device and the sink device; and establishing a connection to an external communication apparatus that has responded to any of the first signal, the second signal, and the third signal.

* * * * *